United States Patent [19]
Natali

[11] Patent Number: 5,623,487
[45] Date of Patent: Apr. 22, 1997

[54] DOUBLY ORTHOGONAL CODE AND FREQUENCY DIVISION MULTIPLE ACCESS COMMUNICATION SYSTEM

[75] Inventor: Francis D. Natali, Pt. Townsend, Wash.

[73] Assignee: Stanford Telecommunications, Inc., Sunnyvale, Calif.

[21] Appl. No.: 444,749

[22] Filed: May 19, 1995

[51] Int. Cl.$^6$ .............................. H04J 11/00; H04J 13/00
[52] U.S. Cl. ........................................... 370/342; 375/200
[58] Field of Search ................................. 370/18, 19, 21; 375/200, 205

[56] References Cited

U.S. PATENT DOCUMENTS 5,103,459  4/1992  Gilhousen et al. ..................... 375/205
5,375,140  12/1994  Bustamante et al. .................... 370/18

Primary Examiner—Melvin Marcelo
Attorney, Agent, or Firm—Jim Zegeer, Esq.

[57] ABSTRACT

In an orthogonal code division multiple access (OCDMA) radio communication system having at least one base station and a plurality of remote subscriber terminals, the improvement comprising the method of reducing the sensitivity of OCDMA to access noise due to time base error and multipath delay spread comprising (1) reducing the size of the orthogonal signal set on a single carrier, and (2) providing additional carriers with orthogonal frequency spacing for additional subscriber capacity.

4 Claims, 3 Drawing Sheets

DOUBLY ORTHOGONAL CODE AND FREQUENCY DIVISION MULTIPLE ACCESS COMMUNICATION SYSTEM

BACKGROUND OF THE INVENTION

Spread spectrum communications is being used for a number of commercial applications and is proliferating at a rapid rate. Orthogonal code division multiple access (OCDMA) has been proposed (see U.S. Pat. No. 5,375,140 "WIRELESS DIRECT SEQUENCE SPREAD SPECTRUM DIGITAL CELLULAR TELEPHONE SYSTEM", and U.S. Ser. No. 08/257,324, filed Jun. 7, 1994, incorporated herein by reference) as an effective technique for improving the capacity, i.e., bandwidth efficiency, of the more conventional quasi-orthogonal CDMA.

In conventional direct sequence (DS) spread spectrum CDMA systems, the individual users transmit on the same frequency using different pseudo-noise (PN) codes. The PN codes are quasi-orthogonal, i.e. they have relatively low but nonzero cross-correlation values with each other.

In an OCDMA system, each user is assigned a code which is orthogonal to all of the other user codes (i.e. the orthogonal codes have a cross-correlation value of zero with each other). Further, the orthogonal code period is chosen such that the code repeats an integer number of times (usually once) in data symbol time. The code epoch is synchronized with the symbol transitions so that no data transitions occur within the code.

The number of users is limited by the number of orthogonal functions available, which for binary codes is equal, at most, to the length of the code. An example is the set of Radamacher-Walsh functions for which there are $2^n$ orthogonal functions of length $2^n$ where n is a positive integer. Note that the chipping rate is equal to the maximum number of orthogonal users times the symbol rate. This implies that a high data rate requires a much higher chipping rate.

OCDMA systems are designed such that all signals are received in time and frequency synchronism. Thus all users remain orthogonal to each other and,in an ideal world, any user can be recovered with no multiple access noise from other users. This is most practical in a star configured network where a multiplicity of users transmit to and receive from a single hub station. This configuration is often used in satellite networks.

There are, of course, a number of practical considerations and real-world effects that cause OCDMA performance to degrade from ideal. For example, multipath returns that are delayed a significant portion of a chip are no longer truly orthogonal and cause access noise. This is a problem for high data rate systems, since the chipping rate is correspondingly higher, and the multipath delay spread becomes increasingly significant. A technique for combating this effect is disclosed in Magill U.S. patent application Ser. No. 08/352,313, filed Dec. 8, 1994 entitled "ORTHOGONAL CODE DIVISION MULTIPLE ACCESS COMMUNICATION SYSTEM HAVING MULTICARRIER MODULATION", also incorporated herein by reference. In this application, it is disclosed that multiple OCDMA signals be transmitted on orthogonally spaced carriers (i.e. spaced at the chipping rate) and the data from a single user is demultiplexed onto the multiple carriers. In this way, the chipping rate is reduced by the number of carriers.

OBJECTS OF THE INVENTION

The invention described below is an extension of the OCDMA multicarrier invention disclosed in U.S. patent application Ser. No. 08/352,313 in that it employs multiple OCDMA signals transmitted on orthogonally spaced frequencies. In this case, however, a single user transmits on only a single orthogonal function on a single frequency. That is, the system can accommodate a total number of users equal to the product of the number of orthogonal functions and the number of carriers. Another way to view this is that the system utilizes both time and frequency orthogonal properties of waveforms, thus the name "Doubly Orthogonal CDMA (DOCDMA)". For a given number of users, the chipping rate is reduced by the number of carries compared to strict OCDMA. This has several benefits including:

Much easier to acquire due to the lower chipping rate.

Multipath delay spread causes less access noise due to longer chip period.

More uniform power spectral density.

Higher bandwidth efficiency.

Lower receiver power dissipation due to lower clocking rates.

The above attributes made multicarrier OCDMA very attractive for satellite networks with a multiplicity of mobile users, such as those that support personal communications.

SUMMARY OF THE INVENTION

According to the invention, an orthogonal code division multiple access (OCDMA) terrestrial or satellite based communication system is provided having at least one base station and a plurality of remote subscriber terminals, the sensitivity of OCDMA to access noise due to time base error and multipath delay spread is reduced by reducing the size of the orthogonal signal set on a single carrier (and thus the number of subscribers that can be assigned to that frequency) and employing additional carriers with orthogonal frequency spacing for additional subscriber capacity. This produces a doubly orthogonal code and frequency division multiple access communication system.

DESCRIPTION OF THE INVENTION

The above and other objects, advantages and features of the invention will become more apparent when considered with the following specification and accompanying drawings wherein:

FIG. 1A is a block diagram of a satellite based OCDMA communication system incorporating the invention, FIG. 1B is a block diagram of a terrestrial based OCDMA communication system incorporating the invention, FIG. 2 is a block diagram of a transmitter for a doubly orthogonal code multiple access system (DOCDMA) incorporating the invention, FIG. 3 illustrates the composite spectrum for DOCDMA signals, and FIG. 4 is a functional block diagram for a DOCDMA receiver incorporating the invention.

DETAILED DESCRIPTION OF THE INVENTION

As mentioned above, this invention is an extension of the OCDMA multicarrier scheme of U.S. patent application Ser. No. 08/352,313, in that it employs multiple OCDMA signals transmitted on orthogonally spaced frequencies. In the present invention, however, a single user transmits on only a single orthogonal function on a single frequency.

Figure 2:
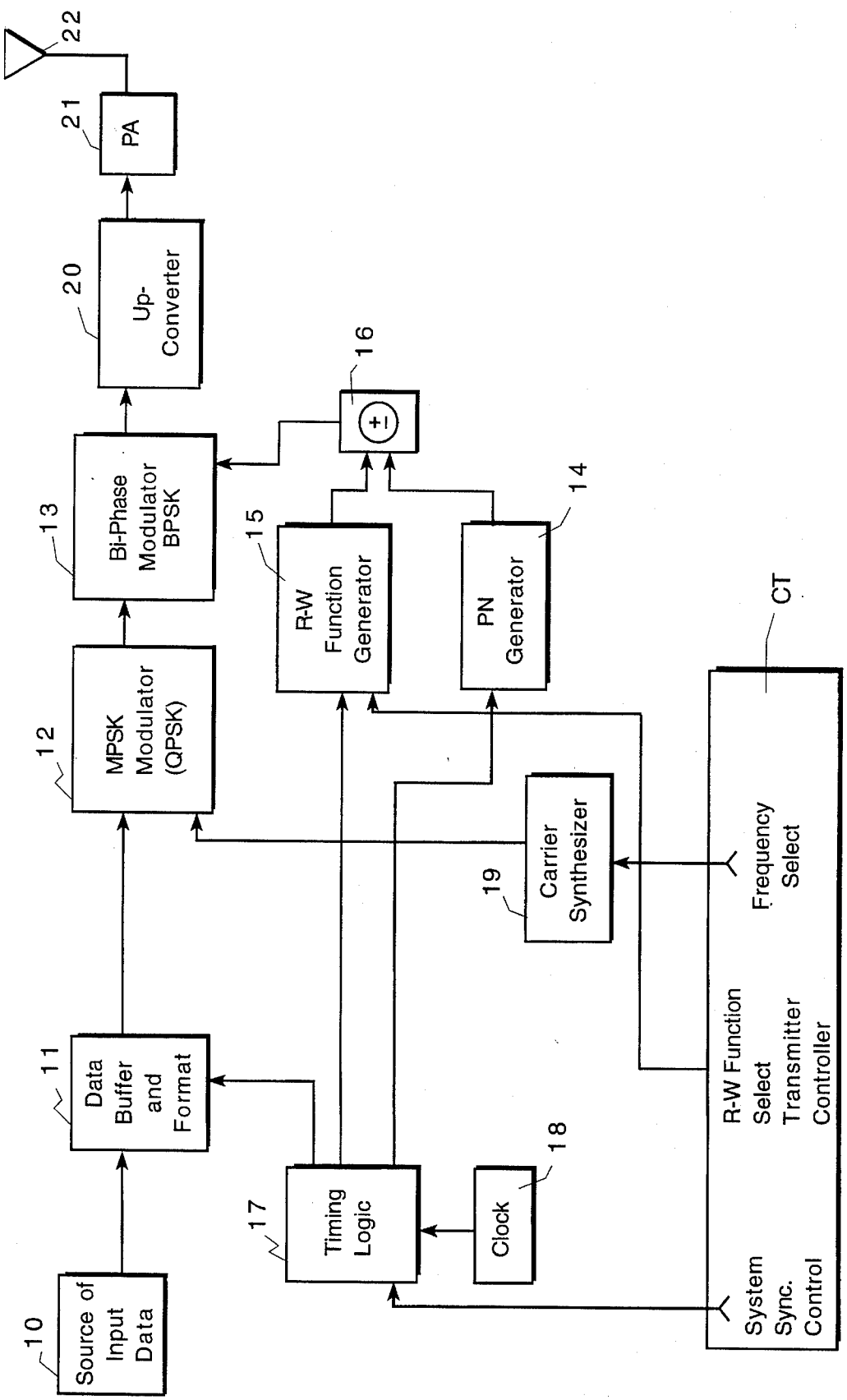

An embodiment of the transmitter is shown in FIG. 2. The input data from source 10 is buffered and formatted 11 and then is modulated on a carrier using MPSK modulation, where M is $\geq 2$. One would typically use M=4, i.e. QPSK modulation. Forward Error Correction (FEC) coding and interleaving may also be employed, depending on the application.

The signal is then BPSK modulated with a binary sequence which is the Mod-2 sum 16 of a PN sequence from PN generator 14 and one member of a set of binary sequences which are orthogonal over a symbol period. The Radamacher-Walsh (RW) functions 15, for which there are $2^n$ orthogonal functions of length $2^n$ where n is a positive integer, will be assumed here for illustrative purposes. An RW function select signal from controller C selects the desired member of the set of RW sequences for Mod-2 summing with the selected PN code.

The same PN code is employed by each of the members of a single "cell" or orthogonal set. The PN clock rate from timing logic circuit 17 which is drive by clock 18 is usually selected to be the same as the RW chip rate, although this is not necessary.

A system synchronizing signal to timing logic circuit 17 and a frequency select signal to conventional carrier synthesizer 19. The signal waveform from BPSK modulator is up-converted 20, power amplifier 21 and broadcast by antenna 22.

As mentioned above, each user is assigned a code which is orthogonal to all of the other user codes (i.e. the orthogonal codes have a cross-correlation value of zero with each other). Further, the orthogonal code period is chosen such that the code repeats an integer number of times (usually once) in a data symbol time. The code epoch is synchronized with the symbol transitions so that no data transitions occur within the code. Note that the RW chipping rate is equal to the maximum number of orthogonal users times the symbol rate.

The modulated carrier frequency is selected from one of N frequencies which are orthogonal over a RW chip interval, i.e. the carrier frequencies are spaced by the RW chipping rate. The composite signal is up-converted to the appropriate frequency band for transmission.

Figure 1A:
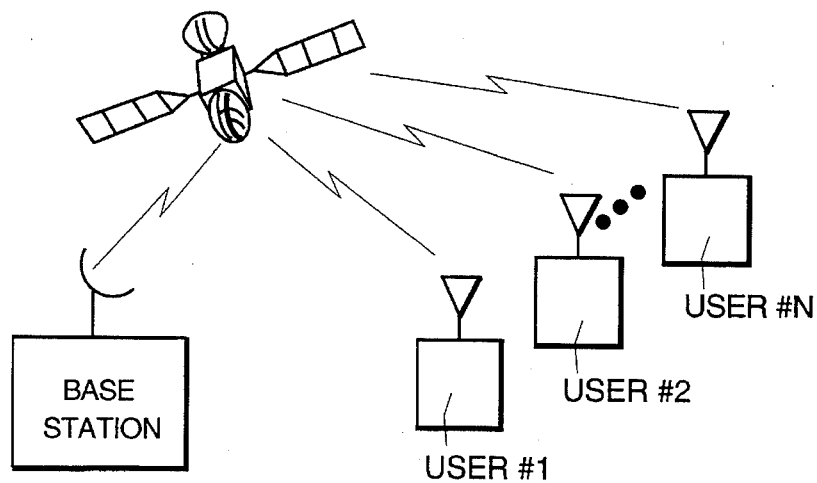
Figure 1B:
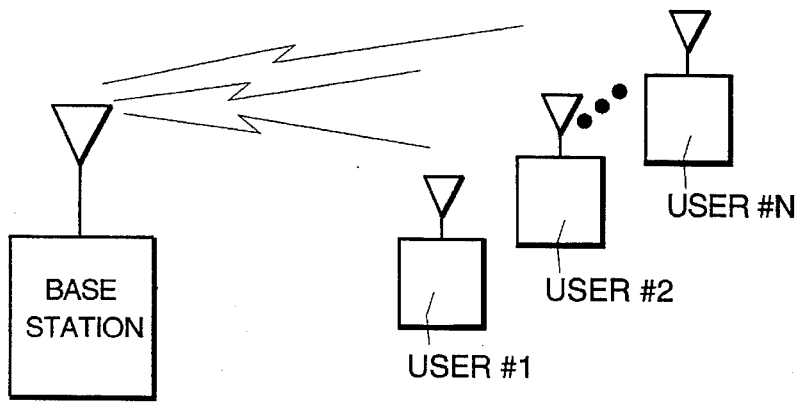
Figure 3:
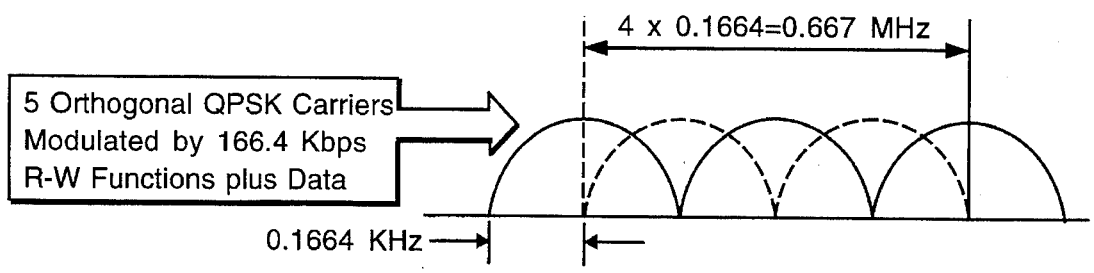

The individual transmissions are synchronized to arrive at the base station in time and frequency synchronism. The resulting received spectrum is as shown in FIG. 3 for the case where the chipping rate is 166.4 kHz and five orthogonal carriers are employed.

Figure 4:
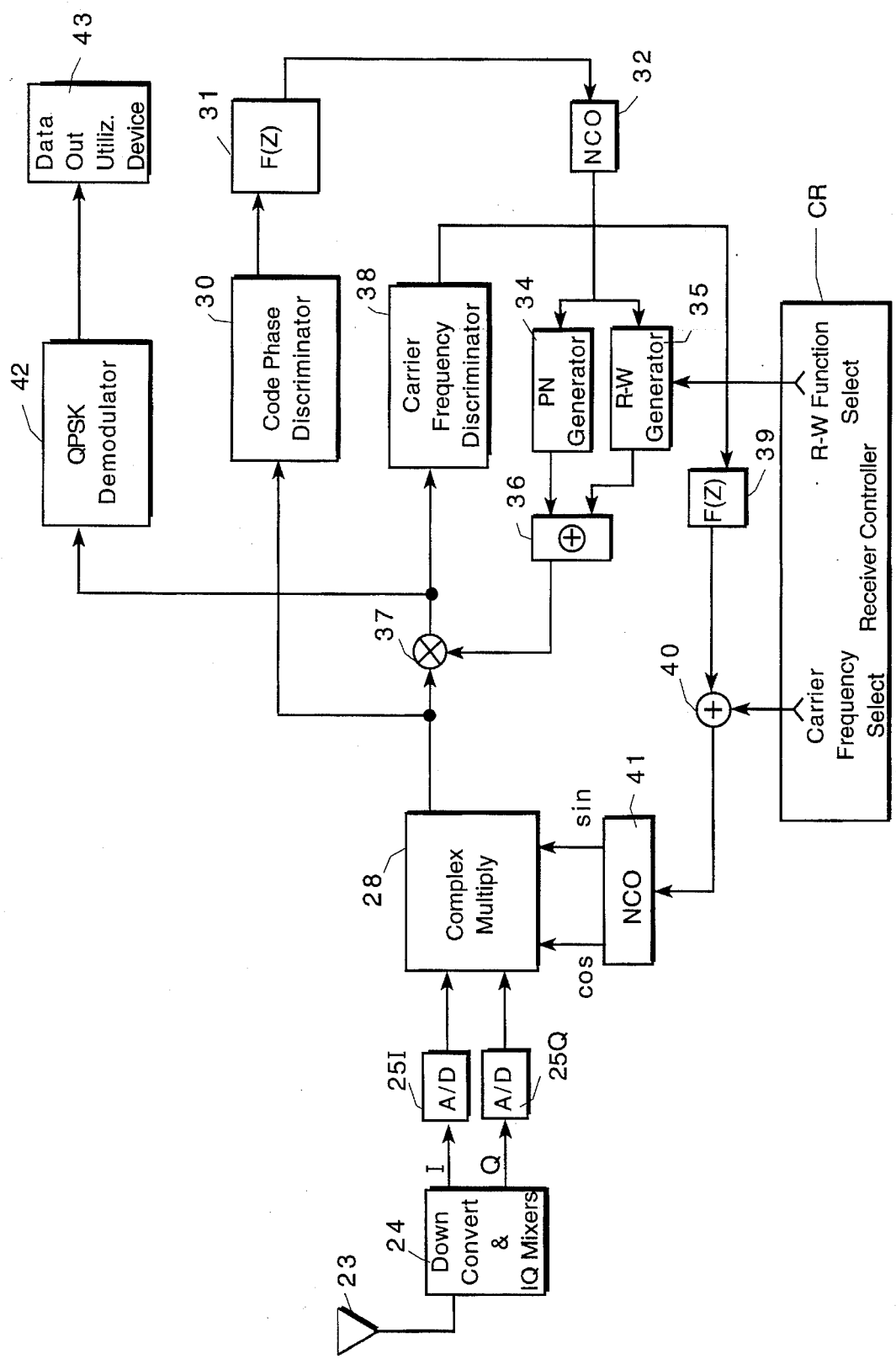

A block diagram of the DOCDMA receiver is shown in FIG. 4. The signals received on antenna 23 signals are down converted 24 to I,Q baseband and converted from analog to digital samples 25I, 25Q and for processing. Tracking loops are employed to estimate received carrier frequency and code phase. The code phase tracking loop includes code phase discriminator 30, filter 31, number controlled oscillator 32, which controls PN generator 34 and RW generator 35 which generate the respective PN and RW functions. Receiver controller CR provides an RW select signal to RW generator 35 to select a particular RW function. The PN and RW functions are combined 36 and applied to mixer 37. The carrier tracking loop incorporates a carrier frequency discriminator 38, filter 39. The carrier frequency select from receiver controller CR is selected 40, the carrier frequency via number controller oscillator 41. The quadrative (cos, sin) signals from NCO 41 are applied to complex multiplier 28 to close the carrier tracking loop. QPSK demodulation 42 is performed in the usual way employing either coherent or differentially coherent detection to provide the data to a utilization device 43.

While preferred embodiments of the invention have been shown and illustrated, it will be appreciated that other embodiments will be readily apparent to those skilled in the art and be encompassed by the claims appended hereto.

What is claimed is:

1. An orthogonal code division multiple access (OCDMA) radio communication system having at least one base station and a plurality of subscriber/user terminals, for communicating data, a transmitter means including:

MPSK modulator means connected to receive said data, a biphase modulator (BPSK) means connected to said MPSK modulator, an RW function set generator having means to select a given RW function set, each RW function having a predetermined RW chipping rate, a carrier frequency synthesizer connected to said MPSK modulator generating selectable carrier frequencies which are spaced by the RW chipping rate, a PN code generator to provide a selected PN code signal, means for summing a selected given RW function signal set with said PN code signal and provide a spreading function signal to said biphase modulator means, said biphase modulator means outputting a composite signal of outputs from said MPSK modulator means and said spreading function signal, said selected RW function set being one member of a set binary sequences which are orthogonal over a symbol period, and means to up-convert the composite signal from said biphase modulator to a broadcast frequency band for transmission.

2. The system defined in claim 1 including receiver means for receiving and demodulating said composite signal to recover said data.

3. The system defined in claim 2 wherein said receiver means includes:

second PN generator means to provide a second PN code signal, second RW function generator means to provide a second RW function signal set, means to sum said second PN code and RW function set signals to provide despreading and decoding signal, a code phase tracking loop having an NCO controlling said second PN generator means and said second RW function generator means, mixer means for receiving said composite signal and said despreading and decoding signal to produce a despreading and decoded output signal, and a carrier frequency tracking loop having an NCO and means for selecting a specific carrier frequency.

4. In a method of reducing the sensitivity of an orthogonal code division multiple access (OCDMA) radio communication system to time base error and multipath delay spread, said radio communication system having at least one base station and a plurality of remote subscriber terminals, first modulator means connected to receive and modulate data onto a carrier for transmission, biphase modulator means connected to receive signals from said first modulator means, RW function set generator having means to select a given RW function set, each RW function set having a predetermined chipping rate, a PN code generator to provide a selected PN code signal, and means for summing the selected RW function signal set with the PN code signal and provide a spreading signal to the biphase modulator means, the biphase modulator means outputting a composite signal of outputs from the first modulator means and said spreading function signal, said method comprising:

(1) reducing the size of the orthogonal signal set on a single carrier and
(2) providing additional carriers with orthogonal frequency spacing for additional subscriber capacity.

* * * * *

UNITED STATES PATENT AND TRADEMARK OFFICE
CERTIFICATE OF CORRECTION

PATENT NO. : 5,623,487
DATED : Apr. 22, 1997
INVENTOR(S) : Francis D. NATALI

It is certified that error appears in the above-indentified patent and that said Letters Patent is hereby corrected as shown below:

<u>In the drawings:</u>

Signed and Sealed this

Fourth Day of November, 1997

Attest:

*Attesting Officer*

BRUCE LEHMAN

*Commissioner of Patents and Trademarks*